United States Patent [19]
Mishima et al.

[11] Patent Number: 5,812,746
[45] Date of Patent: Sep. 22, 1998

[54] IMAGE OUTPUT DEVICE FOR COPYING RECEIVING FACSIMILES AND TRANSMITTING FACSIMILES CAPABLE OF VICARIOUS RECEPTION OF RECEIVED FACSIMILES

[75] Inventors: Hiroshi Mishima; Hiroshi Sakai, both of Osaka, Japan

[73] Assignee: Mita Industrial Co., Ltd, Osaka, Japan

[21] Appl. No.: 757,593

[22] Filed: Nov. 27, 1996

[30] Foreign Application Priority Data

Nov. 30, 1995 [JP] Japan .................................. H7-312422

[51] Int. Cl.⁶ ...................................................... H04N 1/21
[52] U.S. Cl. ........................... 395/113; 358/404; 358/437; 358/444
[58] Field of Search ...................................... 358/404, 437, 358/444, 468; 395/113–116; 399/82–83, 85, 87; H04N 1/21

[56] References Cited

U.S. PATENT DOCUMENTS

| | | | |
|---|---|---|---|
| 4,907,094 | 3/1990 | Mishima et al. ......................... | 358/437 |
| 5,177,620 | 1/1993 | Fukushima ............................... | 358/404 |
| 5,410,419 | 4/1995 | Muramatsu et al. ..................... | 358/468 |
| 5,682,248 | 10/1997 | Yoshida .................................... | 358/468 |

*Primary Examiner*—Kim Yen Vu
*Attorney, Agent, or Firm*—Beveridge, DeGrandi, Weilacher & Young, L.L.P.

[57] ABSTRACT

Image data generated by a reading section to perform copying is outputted to a recording section and, when a facsimile communication is received during such copying, received image data is temporarily stored in an image memory. Meanwhile, an amount of the received image data stored in the image memory is monitored so that, when free capacity of the image memory becomes less than a permitted level, copying is interrupted and operation for copying is switched to operation for outputting the received image data in the image memory through the recording section. Thus, a certain amount of capacity is always available in the image memory and vicarious reception errors due to a memory overflow during copying is eliminated. When the received image data in the image memory has been printed out by the recording section to such an extent that the free capacity in the image memory becomes sufficient again, the interrupted copying is restarted. Thus, copying can be performed without unnecessary delay.

6 Claims, 3 Drawing Sheets

IMAGE OUTPUT DEVICE FOR COPYING RECEIVING FACSIMILES AND TRANSMITTING FACSIMILES CAPABLE OF VICARIOUS RECEPTION OF RECEIVED FACSIMILES

BACKGROUND OF THE INVENTION

1. Field of the Invention

The present invention relates to an image output device having a function for copying and a function for storing communication data in an image memory through vicarious reception when there is communication from a remote terminal device during copying and for outputting the stored communication data after completion of copying, and particularly to an image output device that can deal with a large amount of communication data received during copying.

2. Description of the Prior Art

A facsimile machine as an image output device is provided with a function for printing data communicated from another facsimile machine as a remote terminal device connected by way of a public telephone line. And, the printing function of a facsimile machine can usually be used also in a copying function. However, in such a facsimile machine that is provided with a copying function, a call for facsimile communication from another facsimile machine during execution of the copying function often ends in failure of call reception.

As a conventional example in which the problem is overcome, the publication of Japanese Laid-Open Patent Application No. H5-328090 proposes an image output device provided with a communication data storage means for storing communication data received, a copying page memory for temporarily storing first image data from an image reading means, a received-original page memory for temporarily storing second image data obtained by decoding data stored in said communication data storage means, and a data output means for outputting data from either the copying page memory or the received-original page memory. Here, the amount of data stored in said communication data storage means is detected so that, when the amount is greater than a predetermined level, the source that supplies data to said data output means is switched from the copying page memory to the received-original page memory.

In this conventional example, when a facsimile communication is received during the outputting of data from the copying page memory to the data output means, the data communicated is stored in the communication data storage means through vicarious reception. When the amount of the stored data increases until the free capacity in the communication data storage means becomes less than a predetermined level, the copying operation is interrupted and the source of the output is switched from the copying page memory to the received-original page memory so that the received originals are printed out. When all the received originals stored in the communication data storage means have been printed out, the source to the data output means is switched back to the copying page memory, and the copying operation is thus restarted.

However, in this conventional example, the copying operation cannot be restarted until all remaining facsimile originals have been printed out. This means that, in some cases, the copying operation is interrupted for an unacceptably long time. Moreover, this conventional example requires two page memories as temporary data storage means, one for copying and the other for received originals. This implies accordingly higher manufacturing costs.

SUMMARY OF THE INVENTION

An object of the present invention is to provide an image output device, having facsimile and copying functions, in which copying can be performed with improved operability even if a large amount of data is transmitted from a remote terminal device during copying and with which an effective manufacturing cost reduction is achieved.

To achieve the above object, according to the present invention, an image output device comprises: a reading section for reading an original to be copied in order to generate copying image data; a facsimile function section; a recording section for printing the copying image data and received image data; a copying means for outputting copying image data generated by the reading section to the recording section; an image memory for temporarily storing received image data from the facsimile function section during operation of the copying means; a data amount monitoring means for monitoring an amount of received image data stored in the image memory; and an operation mode switching means that interrupts operation of the copying means to output received image data in the image memory from the recording section when the data amount monitoring means detects scarcity of free capacity in the image memory and that restarts the operation of the copying means when the data amount monitoring means detects sufficiency of free capacity in the image memory.

According to the above described construction, when a facsimile communication is received during copying, image data is temporarily stored in the image memory through vicarious reception. Meanwhile, when the amount of the received image data stored in the image memory exceeds a permitted level, the copying operation is interrupted so that the received image data in the image memory is printed out by the recording section. Thus, it is possible to keep a certain amount of free capacity in the image memory all the time, and thus to prevent communication errors. Moreover, as soon as a sufficient amount of free capacity in the image memory is secured as a result of outputting the received image data in the image memory to the recording section, the operation of the copying means is restarted. Thus, it is possible to prevent the copying operation from being interrupted for an unacceptably long time.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
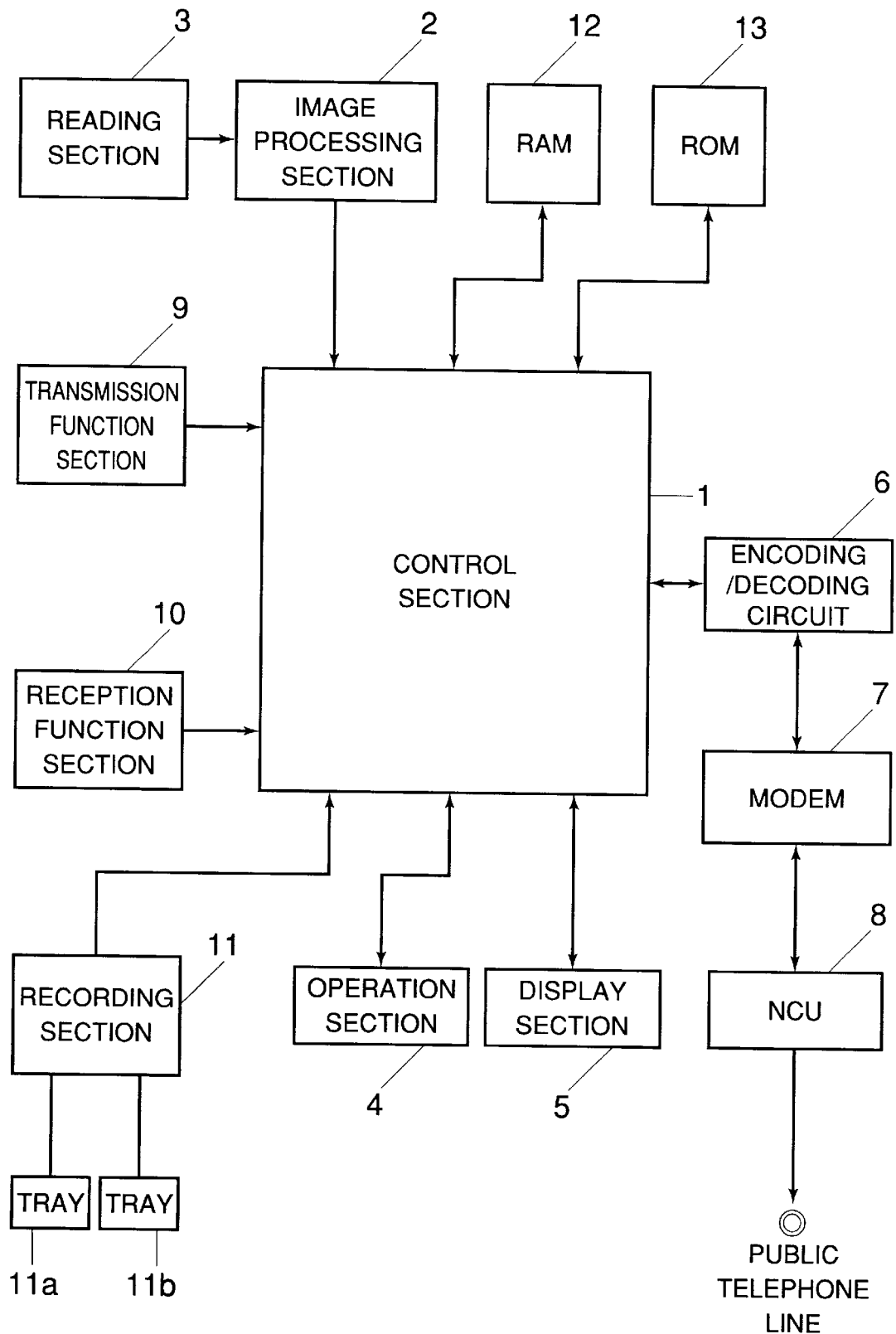
FIG. 1 is a block diagram showing the overall construction of a facsimile machine embodying the present invention.

Hereinafter, an embodiment of the present invention will be described with reference to the drawings. FIG. 1 shows the overall construction of a facsimile machine embodying the present invention. In this figure, reference numeral 1 represents a control section realized with a microcomputer, for controlling the whole facsimile machine. To this control section 1, image data is supplied from an image processing section 2. Originals to be transmitted or copied are optically read by a reading section 3, and the output signals from the reading section 3 are then subjected, in the image processing section 2, to predetermined image processing such as halftone processing so as to be formed into image data. Reference numeral 4 represents an operation section equipped with various operation keys such as a START key. Reference numeral 5 represents a display section that is composed of a liquid crystal display (LCD) device and other components so as to indicate various display modes, the phone number of an addressee, the current time, and other information.

Reference numeral 6 represents an encoding/decoding circuit, reference numeral 7 represents a modulating/demodulating modem, and reference numeral 8 represents an NCU (network control unit). These constitute a reception section (which serves as a transmission section as well) for receiving image data. The control section 1 is connected to the public telephone line by way of the encoding/decoding circuit 6, the modem 7, and the NCU 8. The public telephone line connects the facsimile machine to a remote terminal device such as another facsimile machine via a relay station. Reference numeral 9 represents a transmission function section for creating control signals needed in facsimile communication. Reference numeral 10 represents a reception function section for executing a predetermined procedure for controlling reception. Reference numeral 11 represents a recording section for recording copying image data and received image data onto recording paper.

Reference numerals 11a and 11b represent trays for receiving sheets of paper on which images have been formed by the recording section 11. The sheets on which images of the originals to be copied have been printed are ejected onto the tray 11a, and the sheets on which images received through communication have been printed are ejected onto the other tray 11b.

The control section 1, together with other portions such as the encoding/decoding circuit 6, modem 7, NCU 8, transmission function section 9, reception function section 10, constitutes a facsimile function section for generating received image data from data received from the remote terminal device.

Reference numeral 12 represents a RAM, and reference numeral 13 represents a ROM. The RAM 12 serves as a memory, and is backed up by a battery (not shown) provided as a separate power source. Moreover, the RAM 12 incorporates a page memory 12a serving as an image memory for temporarily storing received image data from the facsimile function section during the copying operation. The ROM 13 stores various parameters for controlling the whole facsimile machine, and necessary software as well.

Figure 2:
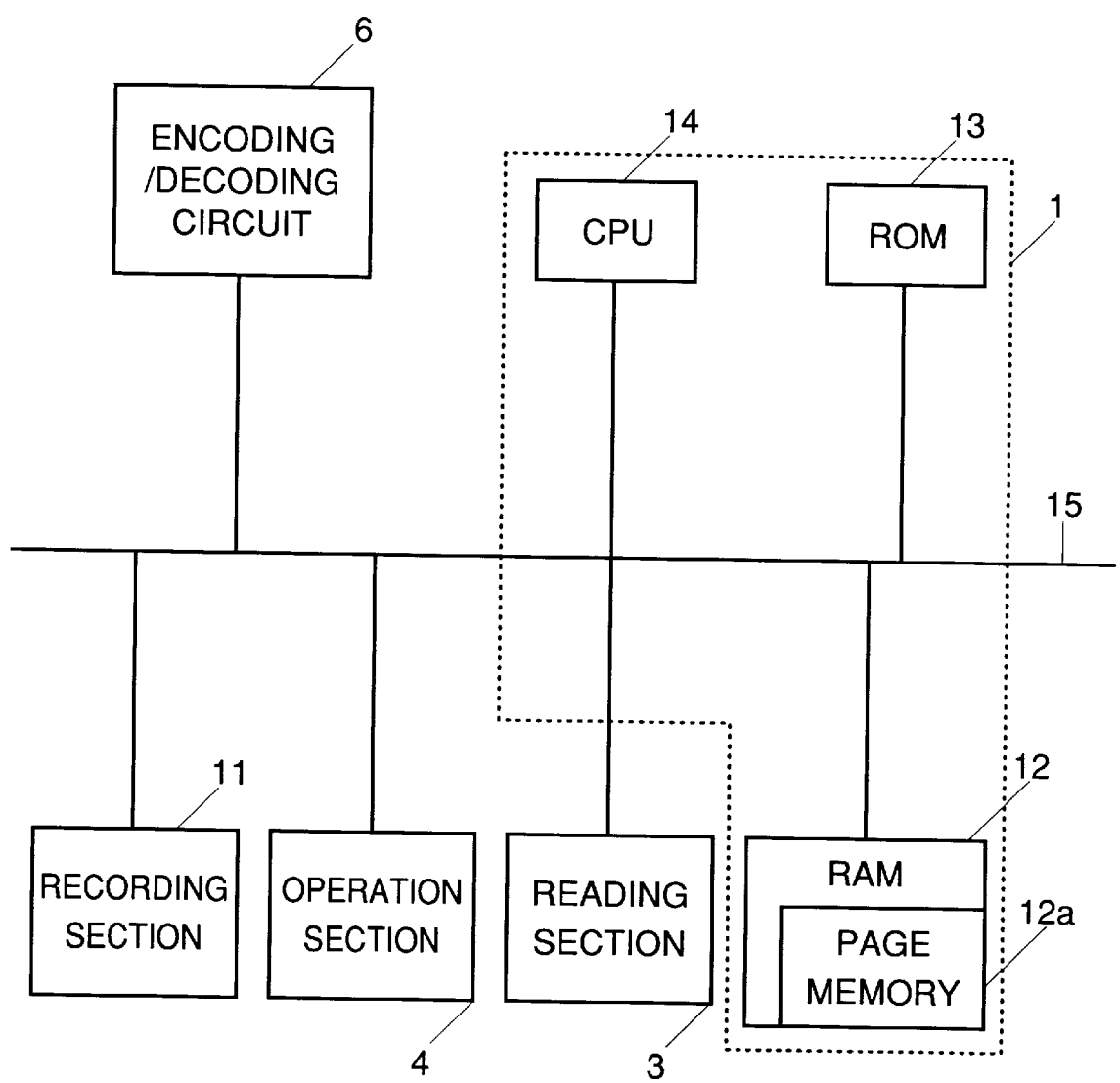
FIG. 2 is a block diagram showing the interconnection between the control section and other constituent portions of the facsimile machine.

FIG. 2 shows the interconnection between the control section 1 and other constituent portions. As shown in this figure, the control section 1 consists of a CPU 14, the above-mentioned RAM 12 and ROM 13, and other components. The CPU 14 is connected through a data bus 15 to other constituent portions such as the reading section 3, operation section 4, recording section 11, RAM 12, and ROM 13.

In its ordinary-operation mode, the facsimile machine having the above described construction operates as follows. When an original to be transmitted is placed on the reading section 3 and the keys of the operation section 4 are operated so that the control section 1 is fed with a call-initiation command, a telephone number, and data to be transmitted such as transmission image data generated by the reading section 3, the control section 1 communicates with the transmission function section 9, the image processing section 2, and the encoding/decoding circuit 6 in order to initiate a call to an addressee via the public telephone line. When the line is connected, the control section 1 sends out data to be transmitted into the public telephone line.

Conversely, when a call is received, the control section 1 answers the call and communicates with the reception function section 10, the recording section 11, the operation section 4, and the encoding/decoding circuit 6 to perform a predetermined procedure for reception control as described later. Note that the ordinary-operation mode is a mode that is established when the facsimile machine is used on its own to perform its ordinary transmission, reception, and copying functions by itself.

In the copying mode, the facsimile machine operates as follows. When an original to be copied is placed on the reading section 3 and the keys of the operation section 4 are operated so that the control section 1 is fed with information on how many copies are to be made, the control section 1 outputs copying image data generated by the reading section 3 directly to the recording section 11, without storing the data in the page memory 12a in the RAM 12. In addition, in this embodiment, when a facsimile communication is received during copying, the received image data is temporarily stored in the page memory 12a in the RAM 12. This method of reception is called vicarious reception.

Figure 3:
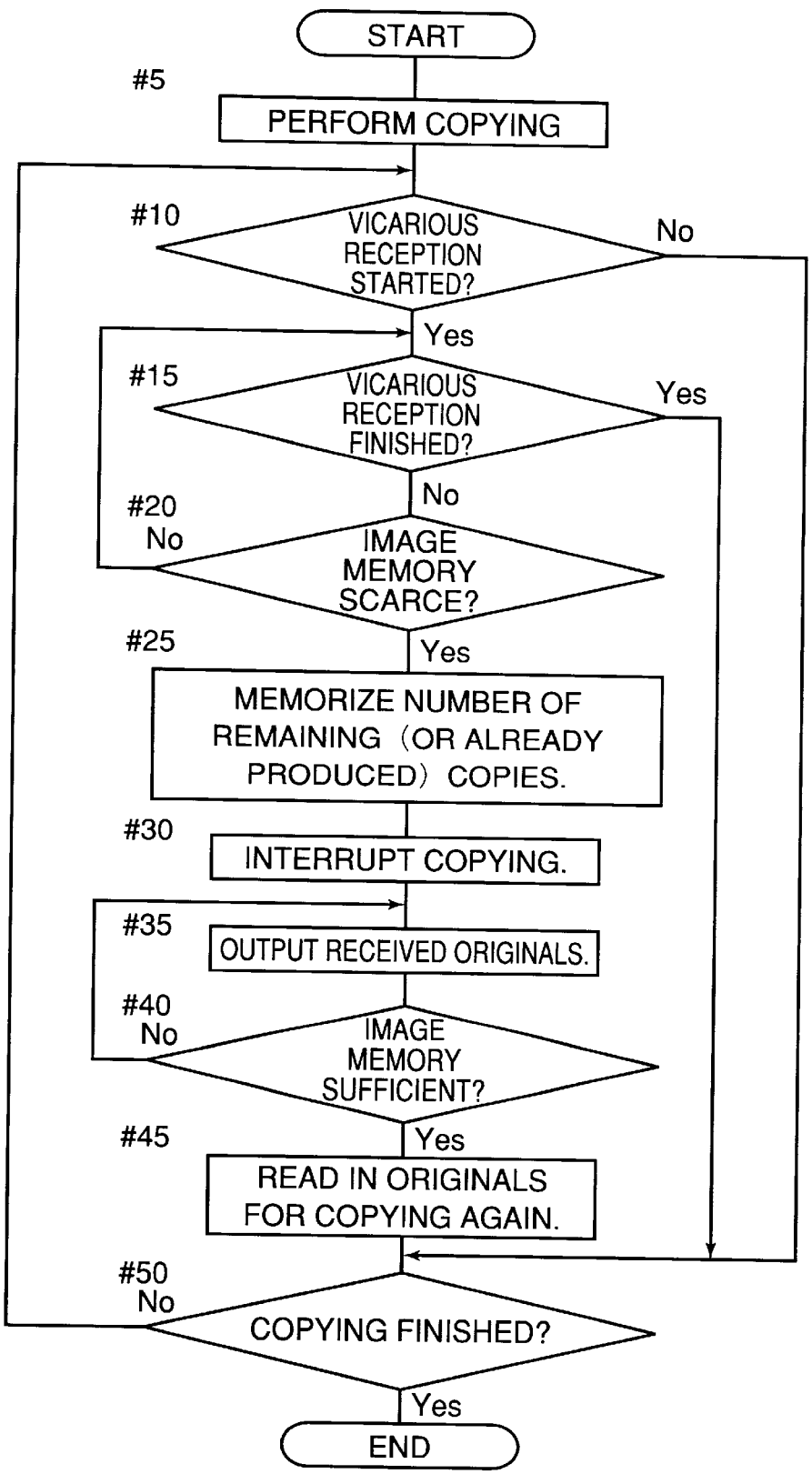
FIG. 3 is a flowchart showing an example of the operation of the control section when it performs vicarious reception while copying.

FIG. 3 shows the operation of the control section 1 when it performs vicarious reception during copying. When the copying mode is established, copying is started in step #5. If no facsimile communication is received during copying, vicarious reception in step #10 is skipped and the operation flow jumps to step #50, where, as soon as completion of copying is recognized, the copying mode is terminated.

If a facsimile communication is received during copying in step #5, vicarious reception is started in step #10. During vicarious reception, received image data is temporarily stored in the page memory 12a. The received image data is printed out by the recording section 11 after completion of copying. However, in some cases, the amount of received image data exceeds the capacity of the page memory 12a.

In this embodiment, such a large amount of data with as follows. In step #15, whether vicarious reception been finished or not is judged. If, in step #20, the amount is the received image data is found to be within the capacity of the page memory 12a, the operation flow jumps to step #50 as soon as vicarious reception is found to have been finished. Note that, meanwhile, copying operation is performed simultaneously with vicarious reception. Images received during this period with vicarious reception are outputted from the recording section 11 after the copying operation is completed at step #50.

If, in step #20, the amount of the received image data stored in the page memory 12a is found to have exceeded the amount of data permitted to be stored there, that is, if the free capacity in the page memory 12a becomes scarce, then, in step #25, the number of remaining copies that are left uncopied for the original placed on the original stand is memorized. The number of remaining copies can be monitored by entering the number of copies to be made beforehand using the operating section 4 and decrementing it thereafter using, for example, a counter serving as an original amount monitoring means provided in the RAM 12. The monitoring can also be achieved by counting the number of copies already made.

When the number of remaining copies has been memorized, then, in step #30, the copying mode is interrupted so that, in step #35, the received originals, i.e. the received image data in the page memory 12a, are printed out by the recording section 11. Thus, a certain amount of free capacity is secured in the page memory 12a all the time, and communication errors are prevented.

In this way, the received originals are printed out by the recording section 11 in preference to the copying operation until the free capacity in the image memory becomes sufficient again. When sufficient free capacity is secured, the operation flow proceeds from step #40 to step #45, where the original for copying is read in again to restart the copying operation. It is also possible to allow the operator to choose when to restart or interrupt the re-reading of the original for copying. The data that has been left in the image memory at the time when the operation flow proceeded from step #40 to #45 can be printed out afterwards.

For example, assume that the original data to be received contains ten pages. During reception in the above-mentioned step #15, if the free capacity of the image memory becomes scarce when seven pages have been received, then the steps from #20 to #50 are executed. When the copying operation is finished (#50), the eighth to tenth pages of the original data are printed out by a separate routine (not shown) after completion of step #50 (i.e. after completion of this operation flow). Note that the original data of the eighth to tenth pages had been received continuously after step #20 without any interruption.

If, in step #35, the copying operation is started when five pages out of the seven received have been printed out, the sixth and seventh pages are not printed here. They can be printed out in step #35 when the free capacity of the image memory becomes scarce in step #20 after the operation flow is restarted from step #10 and the vicarious reception is executed in step #15, if the result of the judgment in step #50 is "no". However, if the result of the judgment in step #50 is "yes", those two pages are not printed within this operation flow. In this case too, the remaining pages are printed out by the above-mentioned separate routine.

In the course of the above-mentioned operation flow, when the recording section 11 performs printing for copying or printing for received images, the number of printed sheets as well as the time at which the printing is started are memorized by the control section 1. When all the printing is completed, the number of printed sheets and the starting time of the printing for copying and for received images are each printed by the recording section 11. For example, "7 sheets for copying at 5:10, 5 sheets for received images at 5:20, remaining 3 sheets for copying at 5:23, and remaining 2 sheets for received images at 5:25" is printed out.

When the copying mode is interrupted and the received images are being printed, the number of remaining sheets to be printed for copying is displayed by the display section 5. When the copying mode is resumed, the number of received images remaining in the page memory 12a is displayed by the display section 5, if there are any.

As mentioned earlier, the sheets on which the image of the original for copying is printed are ejected onto the tray 11a, and the sheets on which the received images are printed are ejected onto the tray 11b. Therefore, when received images are printed out due to insufficiency in the free capacity of the image memory during the vicarious reception, the sheets bearing the received images and the sheets bearing the image of the original for copying never mingle together. As a result, it is not necessary for the user to separate them. A tray of a larger size may be provided instead of the two trays 11a and 11b, so that the sheets bearing the received images and the sheets bearing the image of the original for copying are ejected onto different positions of the tray.

As described above, according to the present invention, image data generated by the reading section for the purpose of copying are outputted directly to the recording section, and when, during such copying operation, a facsimile communication is received, the received image data is temporarily stored in the image memory (vicarious reception). During vicarious reception, the amount of the received image data stored in the image memory is monitored so that, when the free capacity in the image memory becomes less than a permitted level, the copying operation is interrupted and the operation is switched from that for copying to that for outputting the received image data in the image memory through the recording section.

Consequently, according to the present invention, it is not necessary, owing to the automatic monitoring of the capacity of the image memory, to pay any attention to facsimile reception during the copying operation. Thus, the facsimile machine can be used with improved operability. Moreover, as soon as a sufficient amount of free capacity in the image memory is secured as a result of outputting the received image data in the image memory to the recording section, the copying operation is restarted. Thus, it is possible to prevent the copying operation from being interrupted for an unacceptably long time. Furthermore, compared with the conventional example described earlier, less capacity is required for the image memory. Thus, it is possible to effectively reduce manufacturing costs.

Obviously, many modifications and variations of the present invention are possible in light of the above teachings. It is therefore to be understood that within the scope of the appended claims, the invention may be practiced other than as specifically described.

What is claimed is:

1. An image output device comprising:
   a reading section for reading an original to be copied in order to generate copying image data;
   a facsimile function section;
   a recording section for printing said copying image data and received image data;
   a copying means for outputting copying image data generated by said reading section to said recording section;
   an image memory for temporarily storing received image data from said facsimile function section during operation of said copying means;
   a data amount monitoring means for monitoring an amount of received image data stored in said image memory;
   an operation mode switching means that interrupts operation of said copying means to output received image data in said image memory from said recording section when said data amount monitoring means detects scarcity of free capacity in said image memory and that restarts operation of said copying means when said data amount monitoring means detects sufficiency of free capacity in said image memory; and
   a report generating means for counting a number of sheets on which said copying image data is printed and a number of sheets on which said received image data is printed and for outputting the numbers.

2. An image output device as claimed in claim 1, wherein the recording section ejects a sheet on which said copying image data is printed and a sheet on which said received image data is printed onto different trays.

3. An image output device as claimed in claim 1, wherein the recording section ejects a sheet on which said copying image data is printed and a sheet on which said received image data is printed onto different positions of a same tray.

4. An image output device as claimed in claim 1, wherein received image data in the image memory which has not been outputted is outputted by the recording section after operation restarted by the operation mode switching means is completed.

5. An image output device as claimed in claim 4, wherein the recording section ejects a sheet on which said copying image data is printed and a sheet on which said received image data is printed onto different positions of a same tray.

6. An image output device as claimed in claim 4, wherein the recording section ejects a sheet on which said copying image data is printed and a sheet on which said received image data is printed onto different trays.

* * * * *